(12) United States Patent
Itsukaichi et al.

(10) Patent No.: US 10,005,148 B2
(45) Date of Patent: Jun. 26, 2018

(54) CHUCK DEVICE AND ROBOT FOR CHANGING WELDING TIP AND NOZZLE

(71) Applicant: FANUC CORPORATION, Yamanashi (JP)

(72) Inventors: Takashi Itsukaichi, Yamanashi (JP); Hiroshi Inutake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/241,179

(22) Filed: Aug. 19, 2016

(65) Prior Publication Data
US 2017/0057002 A1 Mar. 2, 2017

(30) Foreign Application Priority Data
Aug. 31, 2015 (JP) .................................. 2015-171378

(51) Int. Cl.
*B23Q 3/155* (2006.01)
*B23B 31/16* (2006.01)
(Continued)

(52) U.S. Cl.
CPC .......... *B23K 9/32* (2013.01); *B23B 31/16033* (2013.01); *B23B 31/16275* (2013.01);
(Continued)

(58) Field of Classification Search
CPC ................. Y10T 483/17; Y10T 279/29; Y10T 279/19–279/1993; Y10T 279/26; B23B 31/16033; B23B 31/16075; B23B 31/16112; B23B 31/1615; B23B 31/16187; B23B 31/16225; B23B 31/16262;
(Continued)

(56) References Cited

U.S. PATENT DOCUMENTS 2,470,720 A * 5/1949 Proctor ................. B23B 31/162
279/119
3,088,746 A * 5/1963 Highberg .......... B23B 31/16004
279/110
(Continued)

FOREIGN PATENT DOCUMENTS

CN 102233483 A 11/2011
CN 102861975 A 1/2013
(Continued)

OTHER PUBLICATIONS

Machine translation of JP 11-333654 A, which JP '654 was published Dec. 1999.*

*Primary Examiner* — Erica E Cadugan
(74) *Attorney, Agent, or Firm* — Hauptman Ham, LLP

(57) ABSTRACT

A chuck device capable of efficiently changing a welding tip and nozzle. The chuck device includes a rotatable chuck base, an engagement part fixed to the chuck base so as to rotate integrally with the chuck base and can engage an engagement surface of the welding tip, the engagement part allowing the welding tip to rotate with the chuck base when the chuck base is rotated while engaged with the engagement surface, and a plurality of fingers provided to the chuck base to be openable and closable and can hold the welding tip and the nozzle, the plurality of fingers being capable of moving in directions approaching and separating from the engagement part.

10 Claims, 12 Drawing Sheets

(51) Int. Cl.
*B23K 9/32* (2006.01)
*B23B 31/163* (2006.01)
*B25J 15/10* (2006.01)

(52) U.S. Cl.
CPC ............ *B23Q 3/1556* (2013.01); *B25J 15/10* (2013.01); *B23B 2231/26* (2013.01); *Y10S 901/42* (2013.01); *Y10T 279/19* (2015.01); *Y10T 279/29* (2015.01); *Y10T 483/17* (2015.01)

(58) Field of Classification Search
CPC .......... B23B 31/16291; B23Q 3/155–3/15793; Y10S 901/39; B23K 9/32–9/328; B25J 15/00–15/12
USPC ...... 483/16; 279/137, 110–124, 133; 901/39
See application file for complete search history.

(56) References Cited

U.S. PATENT DOCUMENTS 4,482,162 A * 11/1984 Anegawa ............ B23B 31/1223
279/119
6,851,678 B2 * 2/2005 Mack ...................... B23B 31/06
279/137
2013/0154202 A1 * 6/2013 Low .................... B25B 23/0035
279/9.1
2013/0264317 A1 * 10/2013 Hoffa .................. B23K 10/006
219/121.53
2015/0196977 A1 7/2015 Hughes

FOREIGN PATENT DOCUMENTS

| CN | 104245214 A | 12/2014 |
| JP | 59-24582 A | 2/1984 |
| JP | 5-77044 A | 3/1993 |
| JP | 6-262357 A | 9/1994 |
| JP | 7-132408 A | 5/1995 |
| JP | 7-164147 A | 6/1995 |
| JP | 11-239876 | 9/1999 |
| JP | 11-333654 A * | 12/1999 |
| JP | 2002-192345 A | 7/2002 |
| JP | 2010-089125 A | 4/2010 |
| JP | 2010-149145 A | 7/2010 |
| JP | 2013-180343 A | 9/2013 |

* cited by examiner

CHUCK DEVICE AND ROBOT FOR CHANGING WELDING TIP AND NOZZLE

RELATED APPLICATIONS

The present application claims priority to Japanese Application Number 2015-171378, filed Aug. 31, 2015, the disclosure of which is hereby incorporated by reference herein in its entirety.

BACKGROUND OF THE INVENTION

1. Field of the Invention

The invention relates to a chuck device for replacing a welding tip and a nozzle that are attached to a welding torch main body, and a robot.

2. Description of the Related Art

A device for holding each of a welding tip and a nozzle that are attached to a welding torch main body and attaching and detaching the same to and from the welding torch main body is known (for example, Japanese Laid-open Patent Publication No. 2010-089125 and Japanese Laid-open Patent Publication No. 2010-149145).

Conventionally, a device that can perform replacement of a multitude of welding tips and nozzles in a more efficient manner has been sought.

SUMMARY OF INVENTION

In an aspect of the invention, a chuck device for changing a welding tip screwed into a welding torch main body and a nozzle surrounding the welding tip includes a chuck base rotatably provided.

Further, the chuck device includes an engagement part fixed to the chuck base so as to rotate integrally with the chuck base, and able to engage an engagement surface formed at an outer circumferential surface of the welding tip. The engagement part rotates the welding tip together with the chuck base when the engagement part engages the engagement surface and the chuck base is rotated.

Further, the chuck device includes a plurality of fingers provided at the chuck base so as to be able to open and close. The plurality of fingers is able to move in directions approaching and separating away from the engagement part, and grip each of the welding tip and the nozzle. The plurality of fingers moves in the direction approaching the engagement part so as to be brought into a closed state, and moves in the direction separating away from the engagement part so as to be brought into an open state.

The plurality of fingers may be arranged at positions which are rotationally symmetrical to each other with respect to a rotation axis of the chuck base. The engagement part may include a wall surface defining a hole which receives the welding tip so that the welding tip cannot rotate in the circumferential direction.

The chuck base may include a main body at which the plurality of fingers and the engagement part are provided, a support which supports the main body so as to be movable along the rotation axis of the chuck base, and an elastic member interposed between the main body and the support so as to be able to expand and contract in the direction of the rotation axis.

The chuck device may further include a position detection part which detects that the main body is arranged at a stroke end position separated away from the support in the direction of the rotation axis by a predetermined distance. The chuck device may further include an opening and closing detection part which detects opening and closing of the plurality of fingers.

The chuck device may further include a rotation drive part which rotates the chuck base, and a finger drive part which moves the plurality of fingers. In another aspect of the invention, a robot includes the above-mentioned chuck device and a robot arm to which the chuck base is attached.

BRIEF DESCRIPTION OF THE DRAWINGS

The above-mentioned or other objects, features, and advantages of the invention will be clarified by the following description of preferred embodiments with reference to the accompanying drawings, in which.

DETAILED DESCRIPTION

Figure 1:
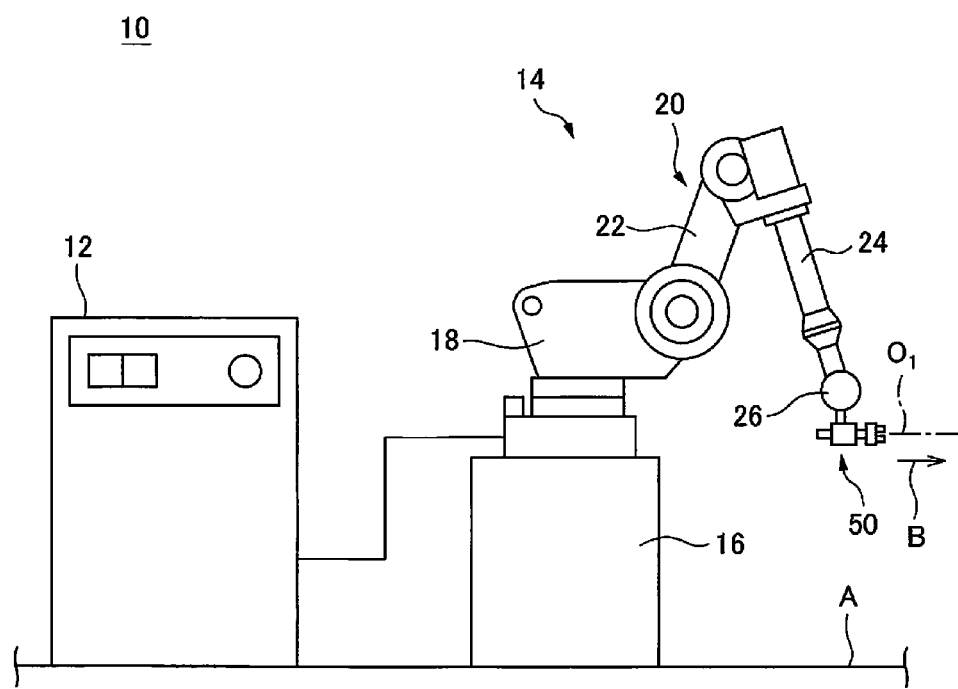
FIG. 1 is a view of a robot system according to an embodiment of the invention.

Hereinafter, embodiments of the invention will be described in detail based on the accompanying drawings. First, a robot system 10 according to an embodiment of the invention will be described with reference to FIGS. 1-4.

Note that, in the following description, an axial direction corresponds to a direction along a rotation axis $O_1$ of a chuck base 64 described below, and for convenience, a direction indicated by an arrow B in the drawings is referred as a frontward in the axial direction (or axially frontward). In addition, a radial direction corresponds to a direction of radius of a circle centered about the axis $O_1$, and a circumferential direction corresponds to a circumferential direction of the circle centered about the axis $O_1$.

The robot system 10 is for changing each of a welding tip and a nozzle attached to a welding torch main body described below, and includes a controller 12 and a robot 14. The controller 12 includes e.g. a central processing unit (CPU) and a storage (both not shown), and directly or indirectly controls each component of the robot 14.

The robot 14 is e.g. a vertical articulated robot, and includes a robot base 16, a revolving drum 18, a robot arm 20, and a chuck device 50. The robot base 16 is fixed on a floor of a work cell A. The revolving drum 18 is attached to the robot base 16 so as to be rotatable about a vertical axis.

The robot arm 20 includes an upper arm 22 rotatably attached to the revolving drum 18 and a forearm 24 rotatably attached to a distal end of the upper arm 22. A wrist 26 is provided at a distal end of the forearm 24, and the chuck device 50 is attached to the distal end of the forearm 24 via the wrist 26.

The controller 12 sends commands to servo motors (not shown) built in the robot arm 20 so as to operate the robot arm 20. The chuck device 50 is moved by the robot 14.

Figure 2:
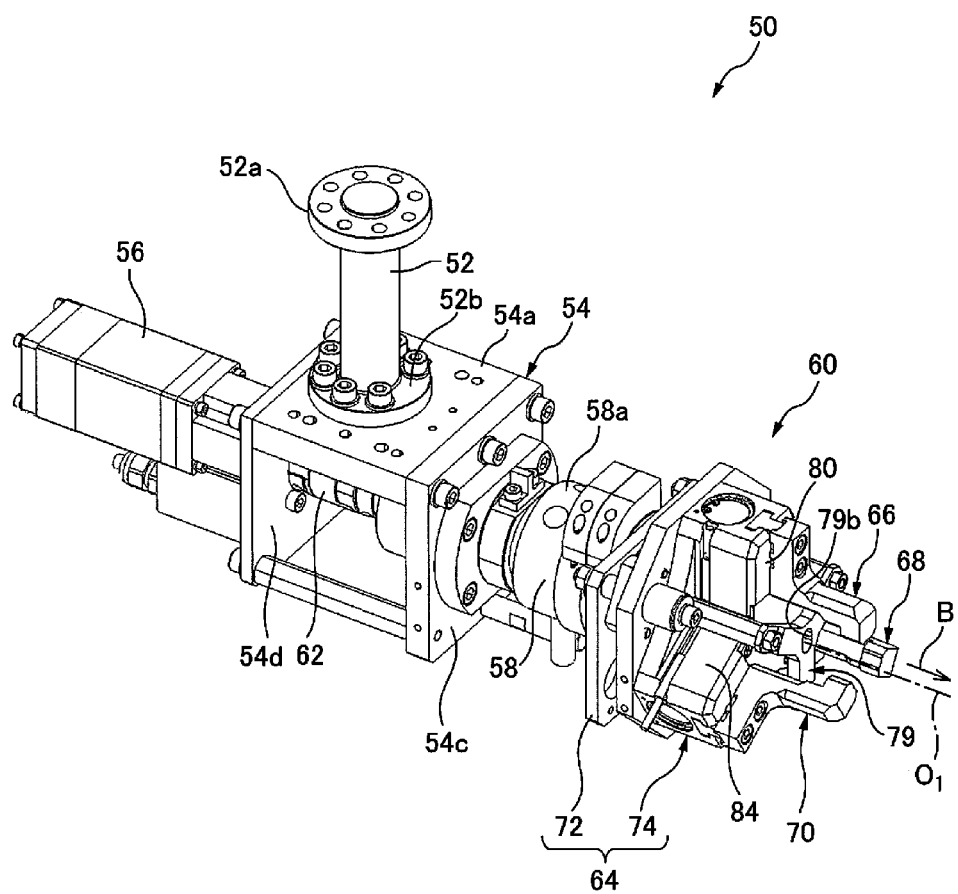
FIG. 2 is a perspective view of the chuck device shown in FIG. 1.

As shown in FIG. 2, the chuck device 50 includes a connection 52, a main base 54, a rotation drive part 56, a joint 58, and a chuck mechanism 60.

The connection 52 is a columnar member extending in a direction orthogonal to the axis $O_1$, and has a flange 52a at one end thereof and a flange 52b at the other end thereof. The flange 52a is connected to the wrist 26, while the flange 52b is fixed on a top wall 54a of the main base 54.

The main base 54 includes the top wall 54a, a front wall 54c, and a rear wall 54d. The front wall 54c is fixed to an axially front end of the top wall 54a, while the rear wall 54d is fixed to an axially rear end of the top wall 54a.

The rotation drive part 56 is fixed to the rear wall 54d of the main base 54. The rotation drive part 56 includes e.g. a servo motor, and rotates a rotor (not shown) extending in the axial direction about the axis $O_1$ (i.e., in the circumferential direction), in accordance with a command from the controller 12.

A rotor housing 62 is provided at the main base 54 so as to extend between the front wall 54c and the rear wall 54d. The rotor housing 62 is a cylindrical member extending in the axial direction so that the center thereof coincides with the axis $O_1$. The rotor housing 62 rotatably receives the rotor of the rotation drive part 56.

The joint 58 is attached to the front wall 54c of the main base 54. The joint 58 is a rotary joint including an outer cylinder 58a fixed to the front wall 54c and a rotary part (not shown) arranged inside of the outer cylinder 58a so as to be rotatable about the axis $O_1$.

The rotor of the rotation drive part 56 extends axially frontward from the rotation drive part 56, passes through the inside of the rotor housing 62, and is connected to the rotary part of the joint 58 at its axially front end. Accordingly, the rotary part of the joint 58 is rotated as the rotor of the rotation drive part 56 is rotated.

Figure 3:
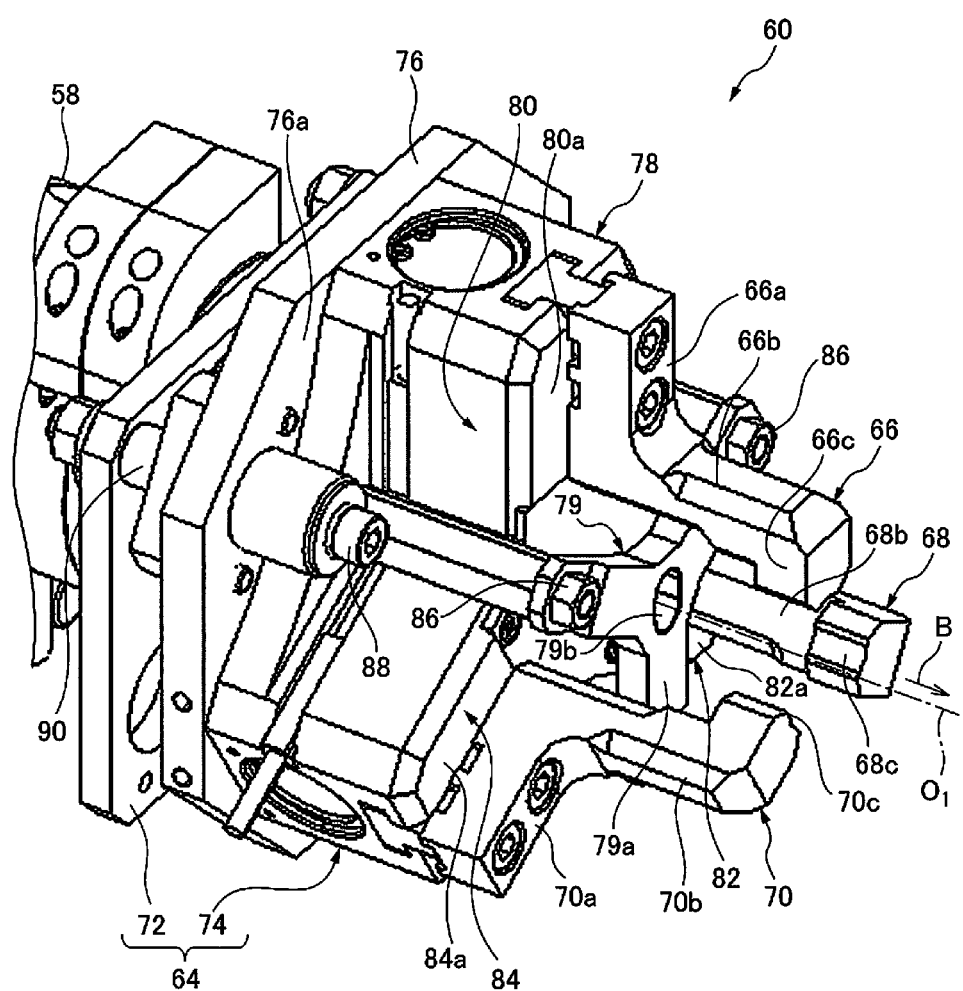
FIG. 3 is an enlarged view of a main section of the chuck device shown in FIG. 2.

The chuck mechanism 60 is connected to the rotary part of the joint 58, and is rotated about the axis $O_1$ by the rotation drive part 56. As shown in FIG. 3, the chuck mechanism 60 includes the chuck base 64, a plurality of fingers 66, 68, and 70 provided at the chuck base 64 so as to be able to open and close, and a finger drive part 71 (FIG. 4) which drives the fingers 66, 68, and 70 to move.

The chuck base 64 includes a support 72 and a main body 74. The support 72 is a flat plate member and is fixed to the rotary part of the joint 58. The main body 74 is disposed at axially frontward of the support 72, and supported by the support 72 so as to be movable in the axial direction.

The main body 74 includes a base plate 76, a tri-shaped base block 78 projecting axially frontward from an axially front end surface 76a of the base plate 76, and an adaptor 79 fixed at axially frontward of the base block 78.

The base block 78 is integrally fixed to the base plate 76, and includes a first block 80, a second block 82, and a third block 84, each of which extends radially outside from the axis $O_1$.

The first block 80, the second block 82, and the third block 84 are arranged around the axis $O_1$ at an interval of 120° in the circumferential direction, and disposed at positions which are rotationally symmetrical to each other with respect to the axis $O_1$.

The finger 66 is movably attached to an axially front end surface 80a of the first block 80. Specifically, the finger 66 includes a base part 66a, an arm 66b extending axially frontward from the base part 66a, and a claw 66c projecting radially inside from an axially front end of the arm 66b.

The base part 66a is attached to the end surface 80a so as to be movable in an extension direction of the first block 80 (i.e. in the radial direction). Thereby, the finger 66 can move in directions approaching and separating away from the rotation axis $O_1$.

The finger 68 is movably attached to an axially front end surface 82a of the second block 82. Specifically, the finger 68 includes a base part (not shown), an arm 68b extending axially frontward from the base part, and a claw 68c projecting radially inside from an axially front end of the arm 68b.

The base part of the finger 68 is attached to the end surface 82a so as to be movable in an extension direction of the second block 82 (i.e., in the radial direction). Thereby, the finger 68 can move in directions approaching and separating away from the rotation axis $O_1$.

The finger 70 is movably attached to an axially front end surface 84a of the third block 84. Specifically, the finger 70 includes a base part 70a, an arm 70b extending axially frontward from the base part 70a, and a claw 70c projecting radially inside from an axially front end of the arm 70b.

The base part 70a is attached to the end surface 84a so as to be movable in an extension direction of the third block 84 (i.e. in the radial direction). Thereby, the finger 70 can move in directions approaching and separating away from the rotation axis $O_1$.

The adaptor 79 is a tri-shaped member and is disposed axially frontward of the base block 78. In this embodiment, the adaptor 79 is manufactured as a member separate from the base block 78, and is detachably attached to the base block 78 by three bolts 86.

The adaptor 79 is formed with a hole 79b recessed axially rearward from an axially front end surface 79a of the adaptor 79. The hole 79b has a polygonal outer shape corresponding to an engagement surface formed at an outer circumferential surface of the welding tip described below, thereby can receive the welding tip therein so as to be unrotatable in the circumferential direction.

The hole 79b is defined by a plurality of wall surfaces arranged so as to surround the axis $O_1$ to have the axis $O_1$ as a center thereof. These wall surfaces engage the corresponding engagement surface of the welding tip when the welding tip is received in the hole 79b.

Thus, in this embodiment, the wall surfaces defining the hole 79b function as an engagement part which engages the engagement surface of the welding tip. The function of the engagement part will be described later.

The finger drive part 71 is arranged inside of the base block 78. The finger drive part 71 is e.g. an air cylinder or a servo motor, and moves the fingers 66, 68, and 70 to open and close, in accordance with a command from the controller 12.

Specifically, the finger drive part 71 synchronously moves the fingers 66, 68, and 70 so as to approach the rotation axis $O_1$ (i.e., the hole 79b), whereby the fingers 66, 68, and 70 are brought into a closed state.

Further, the finger drive part 71 synchronously moves the fingers 66, 68, and 70 so as to separate away from the rotation axis $O_1$ (i.e., the hole 79*b*), whereby the fingers 66, 68, and 70 are brought into an open state.

By such opening and closing movements of the fingers 66, 68, and 70, it is possible to grip and release each of the welding tip and the nozzle.

As described above, the support 72 supports the main body 74 so as to be movable in the axial direction. More specifically, a plurality of support shafts 88 extending in the axial direction are fixed to the support 72. On the other hand, through holes (not shown) which slidably receive the support shafts 88 are formed at the base plate 76 of the main body 74. Due to this configuration, the main body 74 is supported by the support 72 so as to be movable along the support shafts 88.

An elastic member 90 is interposed between the support 72 and the base plate 76. The elastic member 90 includes e.g. a coil spring, and is able to expand and contract in the axial direction. When the main body 74 is pushed axially rearward and thereby the elastic member 90 is compressed to contract, the elastic member 90 urges the main body 74 axially frontward as a reaction force thereof.

Figure 4:
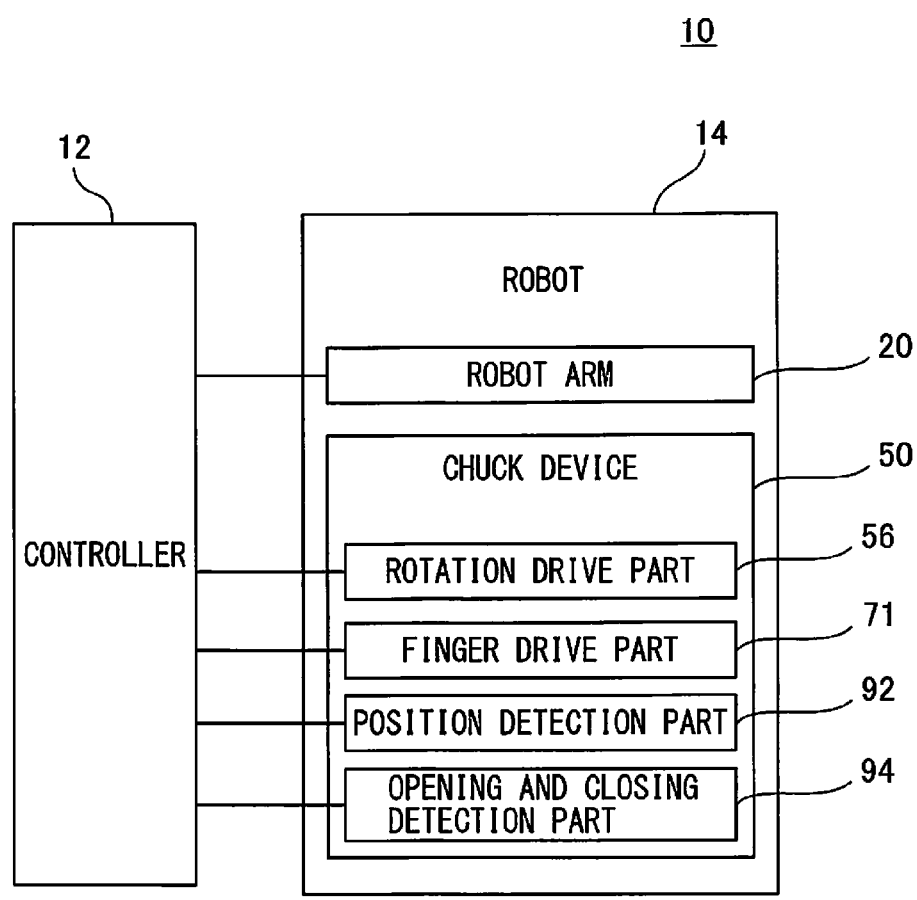
FIG. 4 is a block diagram of the robot system shown in FIG. 1.

The chuck device 50 further includes a position detection part 92 and an opening and closing detection part 94 (FIG. 4). The position detection part 92 detects that the main body 74 is arranged at a stroke end position. The stroke end position is a position corresponding to an axially front end of a movement stroke of the main body 74 with respect to the support 72.

The main body 74 is arranged to be separate away from the support 72 toward axially frontward by a predetermined distance when arranged at the stroke end position. For example, when the main body 74 is arranged at the stroke end position, the elastic member 90 is not compressed or expanded so that the elastic member 90 does not substantially apply an elastic force to the main body 74.

The position detection part 92 includes e.g. a displacement sensor or a proximity switch, and transmits a position detection signal to the controller 12 when the main body 74 is arranged at the stroke end position.

The opening and closing detection part 94 detects opening and closing of the fingers 66, 68, and 70. Specifically, the opening and closing detection part 94 includes e.g. a displacement sensor or a proximity switch, and transmits a closed state detection signal to the controller 12 when the fingers 66, 68, and 70 are brought into the closed state, while it transmits an open state detection signal to the controller 12 when the fingers 66, 68, and 70 are brought into the open state.

The "closed state" indicates a state in which the fingers 66, 68, and 70 approach the axis $O_1$ (the hole 79*b*) within a predetermined distance (e.g., 10 mm). The fingers 66, 68, and 70 can grip each of the welding tip and the nozzle described below, when arranged in the closed state.

On the other hand, the "open state" indicates a state in which the fingers 66, 68, and 70 are separated away from the axis $O_1$ (the hole 79*b*) by a predetermined distance (e.g., 30 mm) or more. The fingers 66, 68, and 70 can release each of the welding tip and the nozzle when arranged in the open state.

Next, the function of the robot system 10 will be described with reference to FIGS. 5-14. As described above, the robot system 10 is for changing the welding tip 102 and the nozzle 104 attached to the welding torch main body 100.

Below, the configuration of the welding torch main body 100 will be briefly described. The welding tip 102 (FIG. 12) is screwed into a distal end of the welding torch main body 100. The welding tip 102 is an elongated member extending along an axis $O_2$ (FIG. 11), wherein the engagement surface is formed at the outer circumferential surface of the welding tip 102.

The engagement surface has e.g. a polygonal outer shape. As described above, the wall surfaces defining the hole 79*b* of the adaptor 79 have a polygonal outer shape corresponding to the engagement surface of the welding tip 102, and can engage the engagement surface.

The nozzle 104 is a cylindrical member extending along the axis $O_2$, and is attached to the welding torch main body 100 so as to surround the welding tip 102. When the welding tip 102 and the nozzle 104 are changed by the robot system 10, the welding torch main body 100 is placed at a predetermined location.

Figure 5:
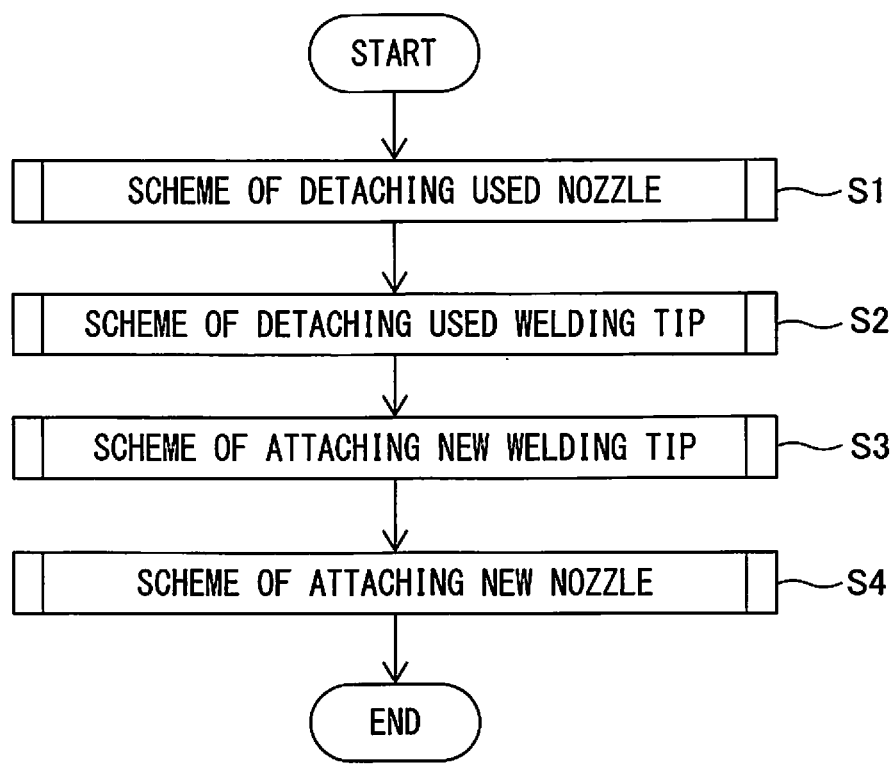
FIG. 5 is a flowchart illustrating an example of an operation flow of the robot system shown in FIG. 1.

Hereinafter, an example of an operation flow of the robot system 10 will be described. The flow shown in FIG. 5 is started when the controller 12 receives from a user or host controller a command for changing the welding tip 102 and the nozzle 104 attached to the welding torch main body 100.

At step S1, the controller 12 executes a scheme of detaching the used nozzle 104 from the welding torch main body 100. This step S1 will be described with reference to FIG. 6. After step S1 is started, at step S11, the controller 12 arranges the fingers 66, 68, and 70 of the chuck device 50 around the used nozzle 104.

Figure 11:
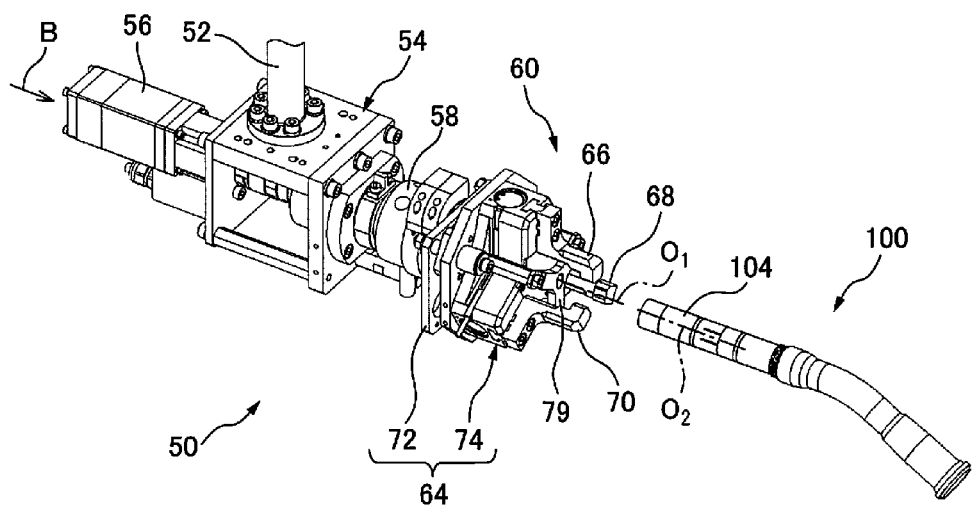
FIG. 11 is a view illustrating a state in which the chuck device is disposed axially rearward of the welding torch main body.

Specifically, the controller 12 operates the robot 14 in accordance with a robot program so as to move the chuck device 50 so that the axis $O_1$ of the chuck device 50 and the axis $O_2$ of the nozzle 104 substantially coincide with each other, as shown in FIG. 11.

Then, the controller 12 operates the robot 14 in accordance with the robot program so as to move the chuck device 50 axially frontward from the position shown in FIG. 11 so that the claws 66*c*, 68*c*, and 70*c* of the fingers 66, 68, and 70 are arranged at radially outside of the nozzle 104.

Note that, the above-mentioned robot program includes operation commands for the robot 14, and can be constructed by teaching the robot 14 a path in which the chuck device 50 is to be moved. The robot program is pre-stored in the storage built in the controller 12.

At step S12, the controller 12 moves the fingers 66, 68, and 70 so as to be brought into the closed state. Specifically, the controller 12 sends a command to the finger drive part 71 so as to synchronously move the fingers 66, 68, and 70 to approach the rotation axis $O_1$ (i.e., the hole 79*b*).

At step S13, the controller 12 determines whether the movement of the fingers 66, 68, and 70 has been completed. Specifically, the controller 12 determines whether it has received a closed state detection signal from the opening and closing detection part 94.

When the controller 12 determines that it has received the closed state detection signal from the opening and closing detection part 94 (i.e. determines "YES"), the controller 12 proceeds to step S14. On the other hand, when the controller 12 determines that it has not received the closed state detection from the opening and closing detection part 94 (i.e. determines "NO"), the controller 12 repeats step S13.

When it is determined "YES" at step S13, the fingers 66, 68, and 70 are in the closed state and grip the nozzle 104 from the outside thereof.

Figure 12:
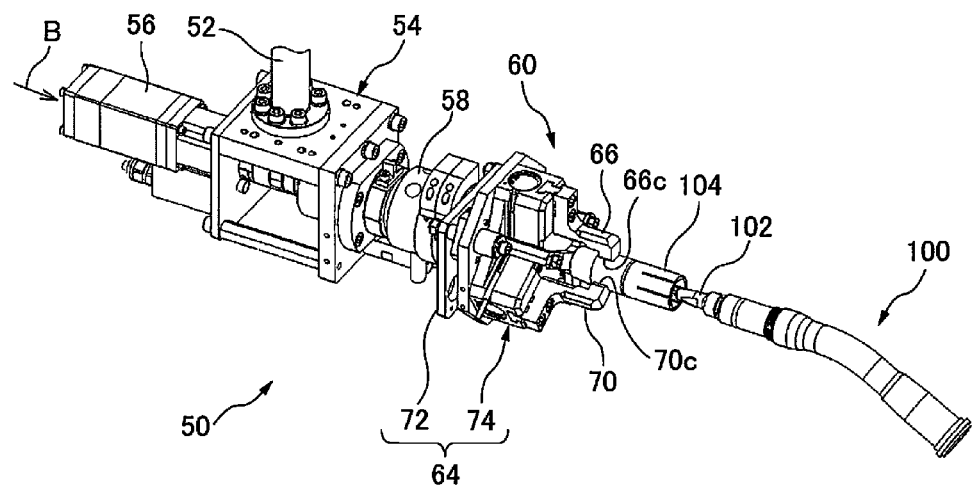
FIG. 12 is a view illustrating a state in which the nozzle is drawn out from the welding torch main body.

At step S14, the controller 12 detaches the used nozzle 104 from the welding torch main body 100. Specifically, the controller 12 operates the robot 14 so as to move the chuck base 64 axially rear side while the fingers 66, 68, and 70 are kept to be in the closed state. As a result, the nozzle 104 is drawn out from the welding torch main body 100. This state is shown in FIG. 12.

At step S15, the controller 12 moves the nozzle 104 to a predetermined disposal zone. Specifically, the controller 12 operates the robot 14 in accordance with the robot program so as to move the chuck device 50 to arrange the nozzle 104 above the disposal zone.

At step S16, the controller 12 moves the fingers 66, 68, and 70 so as to be brought into the open state. Specifically, the controller 12 sends a command to the finger drive part 71 so as to synchronously move the fingers 66, 68, and 70 to separate away from the rotation axis $O_1$ (i.e., the hole 79b).

At step S17, the controller 12 determines whether the movement of the fingers 66, 68, and 70 has been completed. Specifically, the controller 12 determines whether it has received an open state detection signal from the opening and closing detection part 94.

Figure 6:
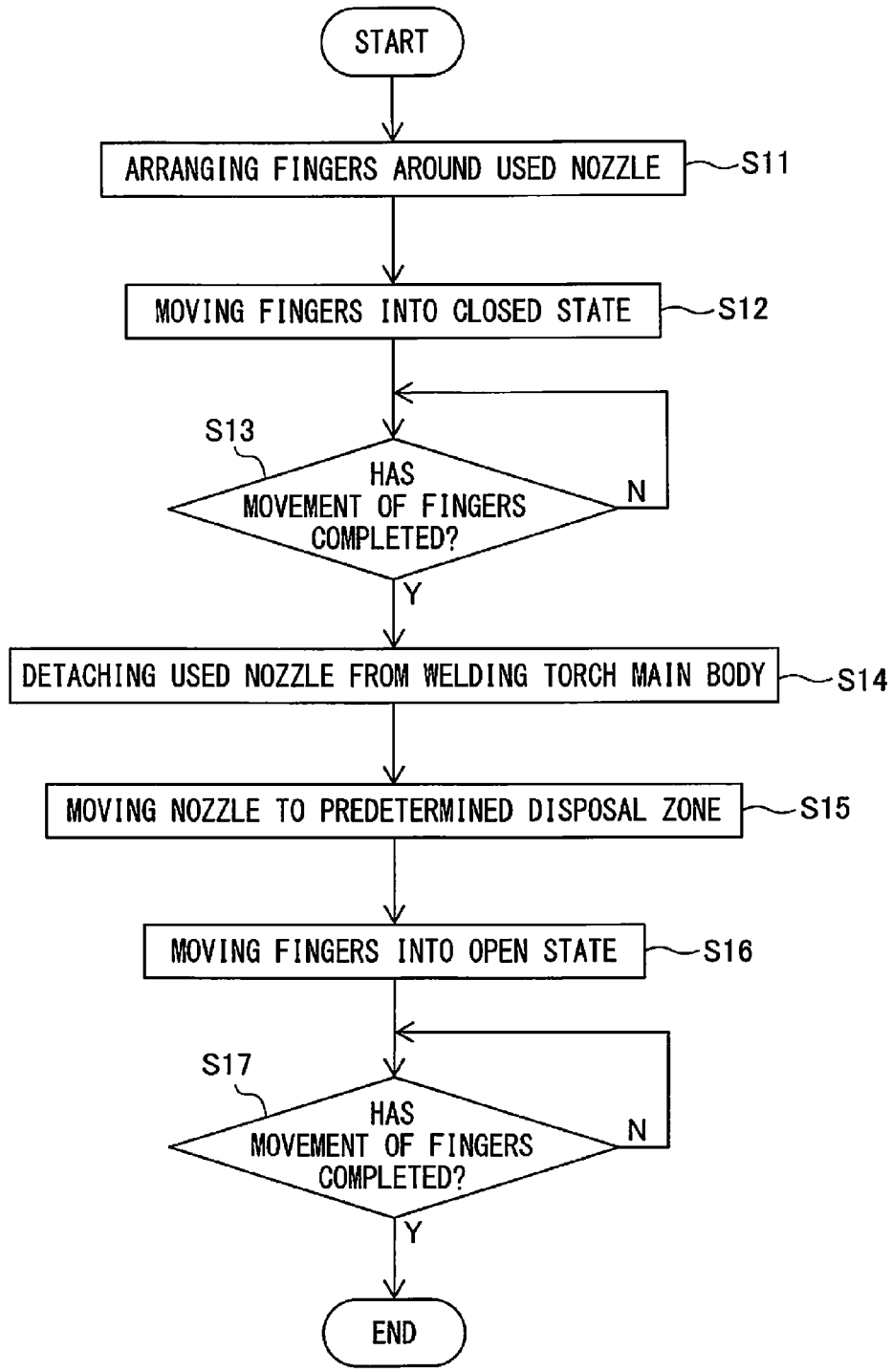
FIG. 6 is a flowchart of step S1 in FIG. 5.
Figure 7:
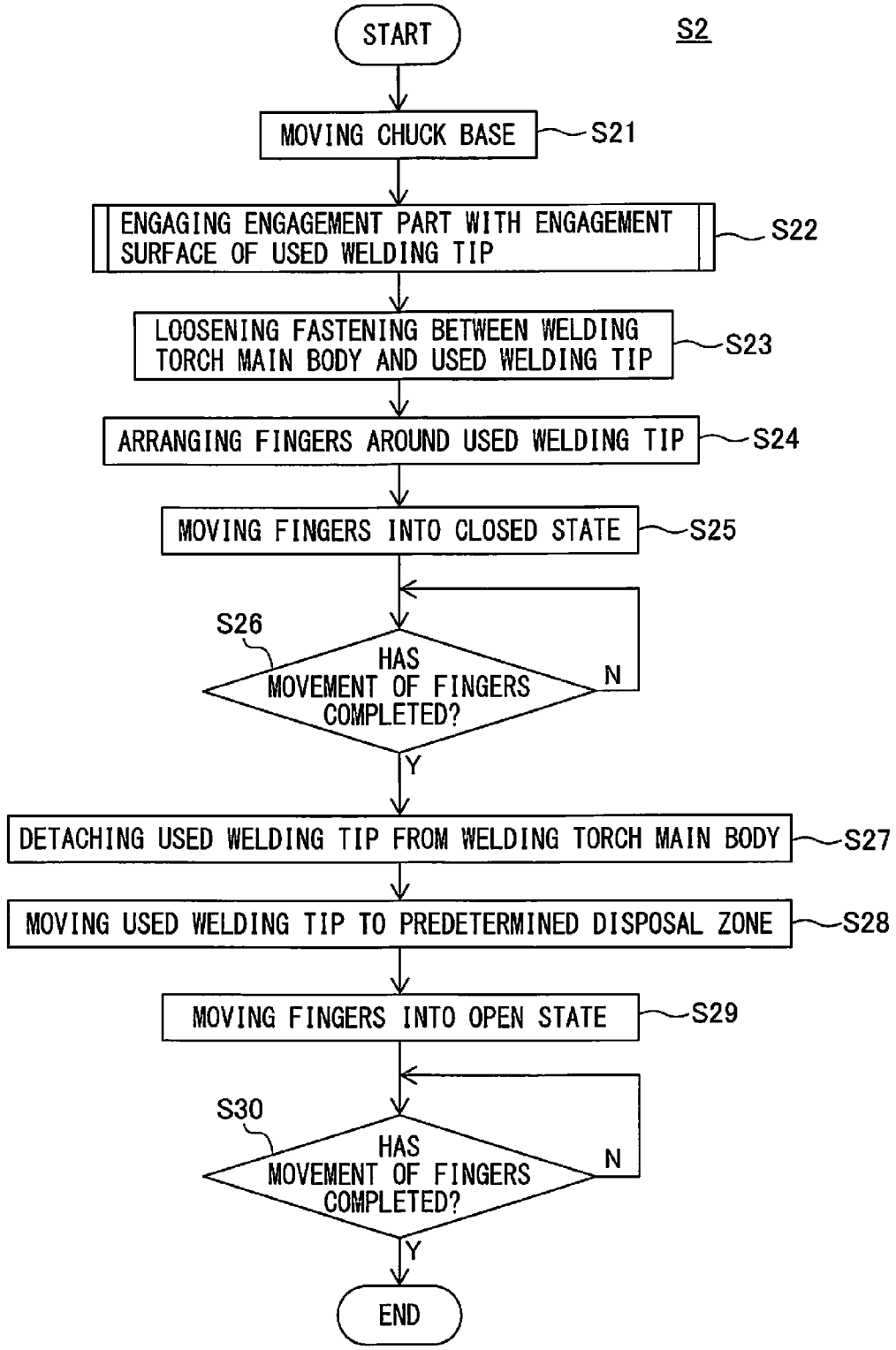
FIG. 7 is a flowchart of step S2 in FIG. 5.

When the controller 12 determines that it has received the open state detection signal from the opening and closing detection part 94 (i.e., determines "YES"), the controller 12 ends step S1 shown in FIG. 6 and proceeds to step S2 shown in FIG. 5. When it is determined "YES" at this step S17, the fingers 66, 68, and 70 are in the open state, and the nozzle 104 gripped by the fingers 66, 68, and 70 is released and received in the disposal zone.

On the other hand, when the controller 12 determines that it has not received the open state detection signal from the opening and closing detection part 94 (i.e. determines "NO"), the controller 12 repeats step S17.

Referring again to FIG. 5, after step S1, at step S2, the controller 12 executes a scheme of detaching the used welding tip 102 from the welding torch main body 100. This step S2 will be described with reference to FIG. 7.

After step S2 is started, at step S21, the controller 12 operates the robot 14 so as to move the chuck device 50 so that the axis $O_1$ of the chuck device 50 and the axis $O_2$ of the welding tip 102 substantially coincides with each other, as shown in FIG. 11.

At step S22, the controller 12 engages the engagement part formed at the chuck base 64 with the engagement surface formed at the outer circumferential surface of the welding tip 102. This step S22 will be described with reference to FIG. 8.

After step S22 is started, at step S221, the controller 12 presses the chuck base 64 against a distal end of the welding tip 102. Specifically, the controller 12 operates the robot 14 so as to move the chuck device 50 axially frontward to a position where the end surface 79a of the adaptor 79 provided at the chuck base 64 is pressed against the distal end of the welding tip 102.

As described above, the hole 79b formed at the adaptor 79 has the outer shape corresponding to the engagement surface of the welding tip 102, and can receive the welding tip 102 so as to be unrotatable in the circumferential direction.

Accordingly, if the hole 79b is arranged relative to the welding tip 102 during execution of step S221 so that the outer shape of the hole 79b matches that of the engagement surface of the welding tip 102 in the circumferential direction, the distal end of the welding tip 102 is inserted into the hole 79b without butting against the end surface 79a of the adaptor 79.

On the other hand, if the hole 79b is arranged relative to the welding tip 102 during execution of step S221 so that the outer shape of the hole 79b is deviated from that of the engagement surface of the welding tip 102 in the circumferential direction, the distal end of the welding tip 102 is butted against the end surface 79a of the adaptor 79 so as to be pressed against the end surface 79a.

In this case, the adaptor 79 is pressed by the distal end of the welding tip 102 toward axially rearward relatively, thereby the main body 74 is displaced toward the support 72. As a result, the elastic member 90 is compressed in the axial direction, and urges the main body 74 toward axially frontward, as a reaction force thereof. Thus, the end surface 79a of the adaptor 79 is pressed against the distal end of the welding tip 102 by the elastic force of the elastic member 90, etc.

At step S222, the controller 12 determines whether the main body 74 is arranged at the stroke end position. Specifically, the controller 12 determines whether it has received a position detection signal from the position detection part 92.

Figure 8:
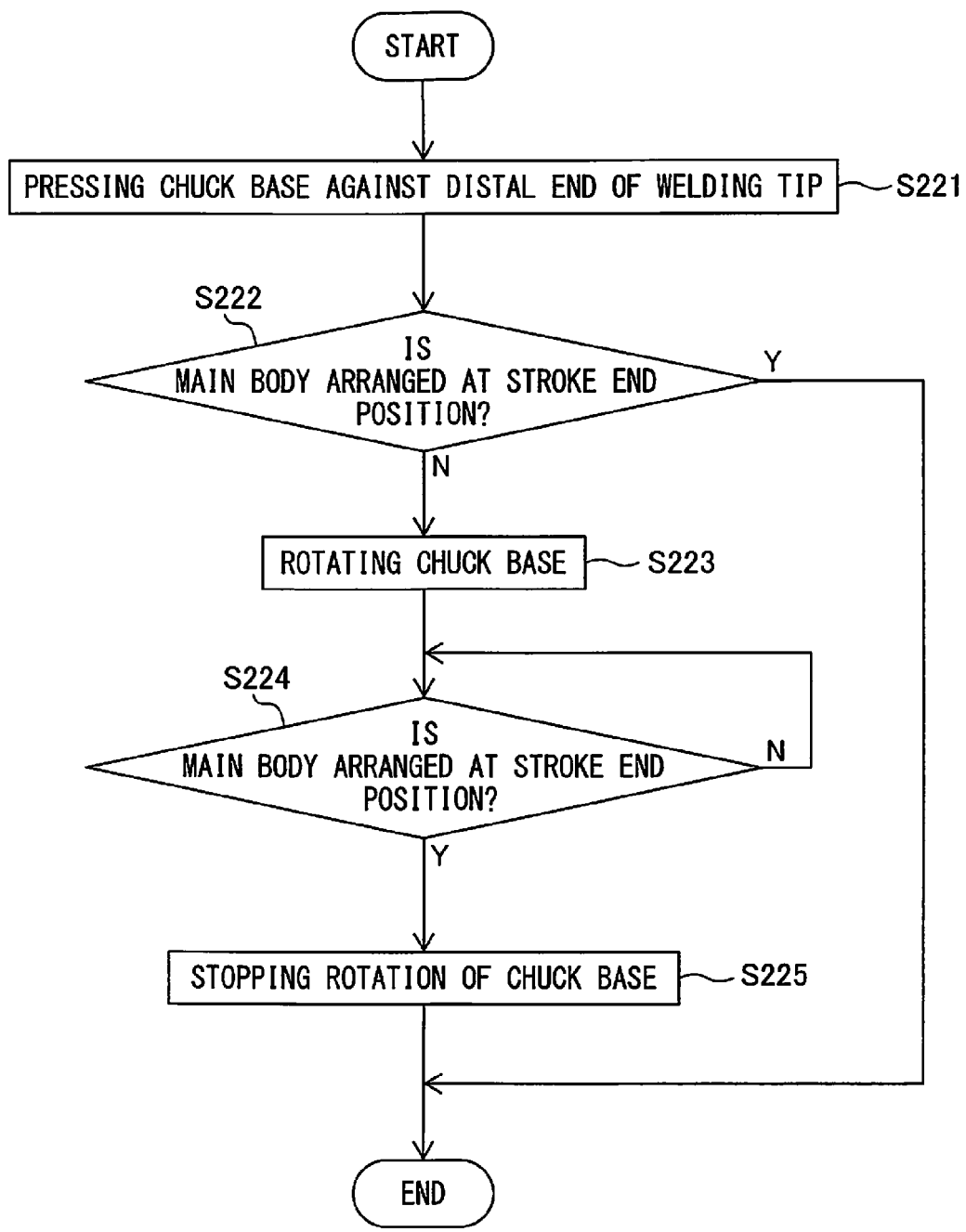
FIG. 8 is a flowchart of step S22 in FIG. 7.
Figure 9:
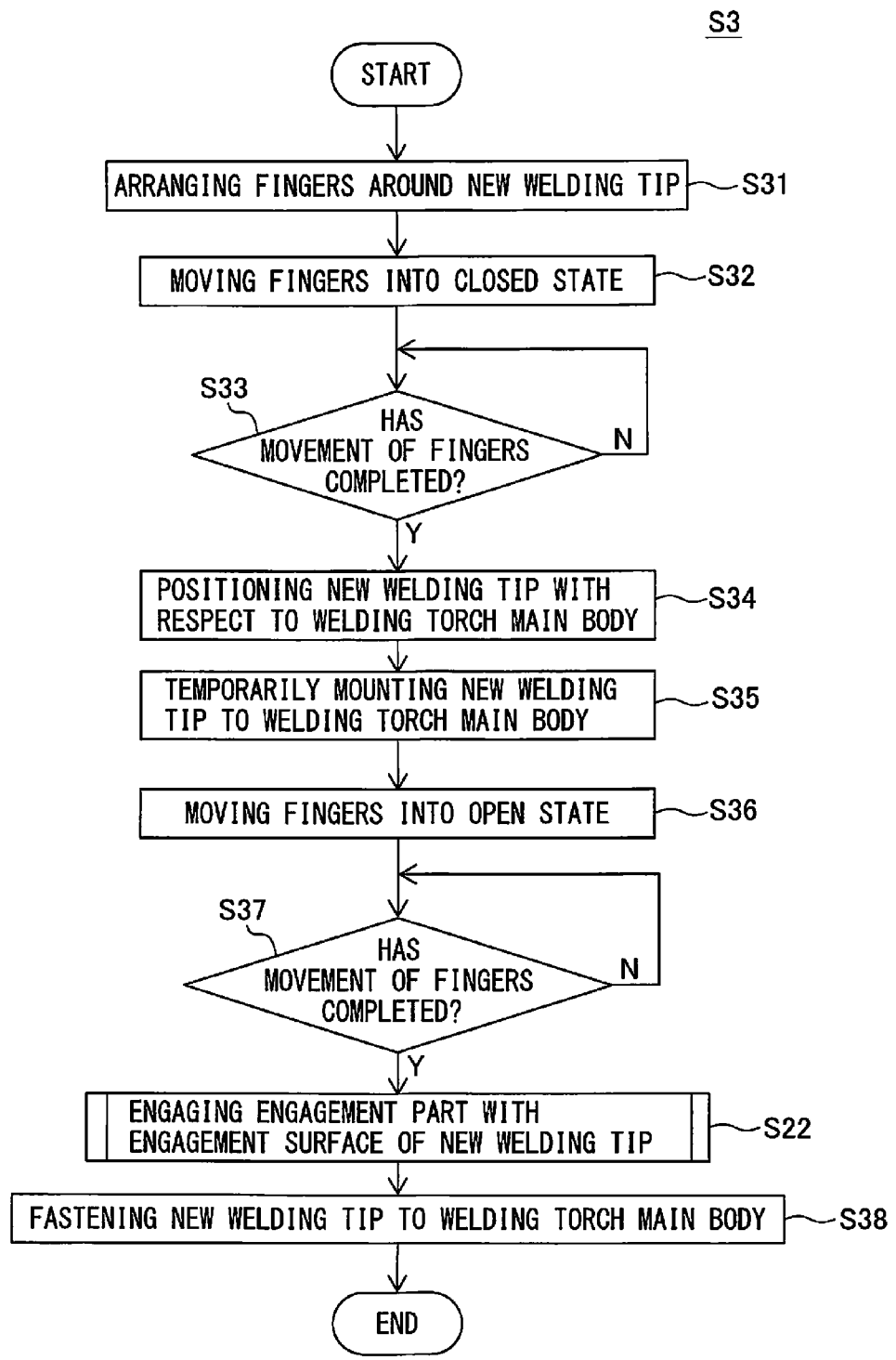
FIG. 9 is a flowchart of step S3 in FIG. 5.

When the controller 12 determines that it has received the position detection signal from the position detection part 92 (i.e., determines "YES"), the controller 12 ends the flow shown in FIG. 8. For example, if the welding tip 102 is inserted into the hole 79b at the end of step S221, since the main body 74 is not pressed and displaced by the welding tip 102, the main body 74 is continuously arranged at the stroke end position.

Accordingly, it is determined "YES" at this step S222 in this case. At this time, the welding tip 102 is received in the hole 79b so as to be unrotatable with respect to the hole 79b, and the wall surfaces defining the hole 79b engage the engagement surface of the welding tip 102.

On the other hand, when the controller 12 determines that it has not received the position detection signal from the position detection part 92 (i.e., determines "NO") at this step S222, the controller 12 proceeds to step S223.

For example, if the welding tip 102 fails to be inserted into the hole 79b and is butted against the end surface 79a of the adaptor 79 at the end of step S221, the main body 74 is displaced toward the support 72 so as to be arranged at axially rearward of its stroke end position. In this case, the position detection part 92 does not send the position detection signal, and therefore it is determined "NO" at this step S222.

At step S223, the controller 12 rotates the chuck base 64 around the axis $O_1$. Specifically, the controller 12 sends a command to the rotation drive part 56 so as to rotate the chuck mechanism 60 in the circumferential direction.

When the outer shape of the hole 79b of the adaptor 79 and the outer shape of the engagement surface of the welding tip 102 coincide with each other in the circumferential direction by rotating the chuck mechanism 60, the main body 74 is displaced axially frontward by the urging force by the elastic member 90, and thereby the welding tip 102 is received in the hole 79b. Then, the main body 74 is again arranged at the stroke end position.

At step S224, the controller 12 determines whether it has received a position detection signal from the position detection part 92, similar to the above-mentioned step S222. When the controller 12 determines "YES", it proceeds to S225.

For example, if the welding tip 102 is received in the hole 79b at step S223, it is determined "YES" at this step S224. On the other hand, when it is determined "NO" at this step S224, the controller 12 repeats step S224.

At step S225, the controller 12 stops the rotation of the chuck base 64. Specifically, the controller 12 stops the operation of the rotation drive part 56, whereby the rotation of the chuck base 64 is stopped. By step S22 shown in FIG. 8, the welding tip 102 is received in the hole 79b of the adaptor 79 so as to be unrotatable relative to the hole 79b.

Figure 13:
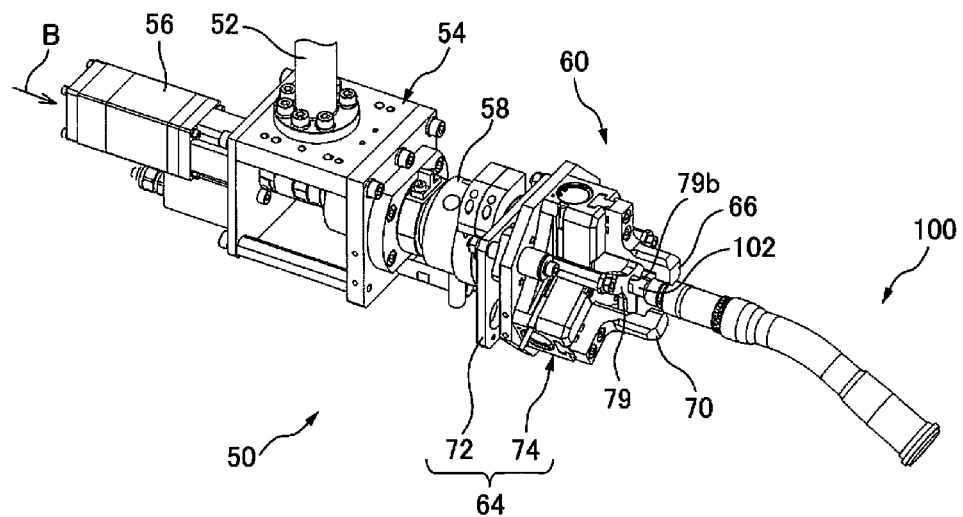
FIG. 13 is a view illustrating a state in which the welding tip is received in the hole formed at the adaptor.

This state is shown in FIG. 13.

Referring again to FIG. 7, after step S22, at step S23, the controller 12 loosens fastening between the welding torch main body 100 and the welding tip 102. Specifically, the controller 12 sends a command to the rotation drive part 56 so as to rotate the chuck mechanism 60 around the axis $O_1$ in a direction in which the fastening between the welding torch main body 100 and the welding tip 102 can be loosened.

As the chuck mechanism 60 is rotated, the welding tip 102 is also rotated together with the chuck mechanism 60 due to the engagement between the engagement surface of the welding tip 102 and the wall surfaces of the hole 79b, whereby the fastening between the welding torch main body 100 and the welding tip 102 is loosened.

At this step S23, the controller 12 rotates the chuck mechanism 60 by a predetermined number of rotations to such an extent that the welding tip 102 is not completely detached from the welding torch main body 100. The predetermined number of rotations is set by a user and can be pre-stored in the storage of the controller 12.

At step S24, the controller 12 arrange the fingers 66, 68, and 70 of the chuck device 50 around the welding tip 102. Specifically, the controller 12 operates the robot 14 so as to move the chuck device 50 from the position shown in FIG. 13 to axially rearward, and arrange the claws 66c, 68c, 70c of the fingers 66, 68, 70 at radially outside of the welding tip 102.

At step S25, the controller 12 sends a command to the finger drive part 71 so as to synchronously move the fingers 66, 68, and 70 to approach the rotation axis $O_1$ (i.e., the hole 79b), similar to the above-mentioned step S12.

At step S26, the controller 12 determines whether it has received a closed state detection signal from the opening and closing detection part 94, similar to the above-mentioned step S13. When the controller 12 determines that it has received the closed state detection signal from the opening and closing detection part 94 (i.e., determines "YES"), the controller 12 proceeds to step S27.

Figure 14:
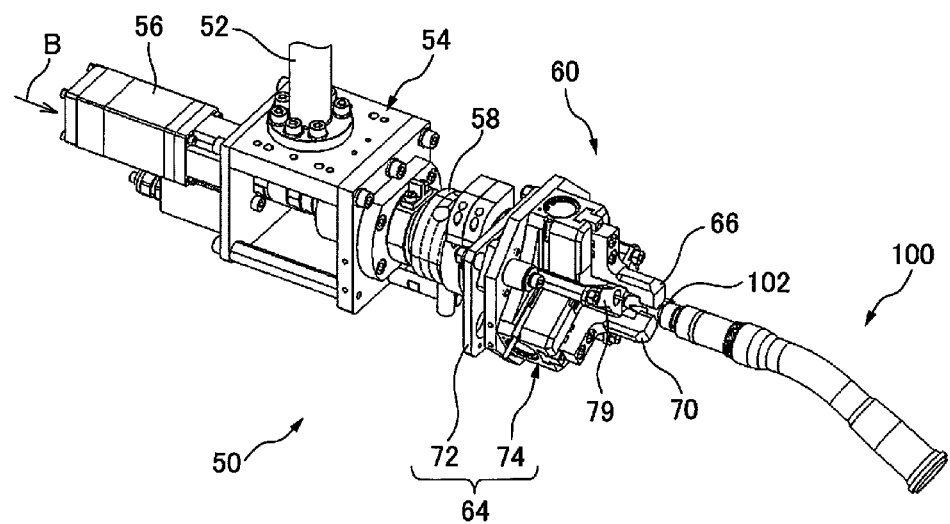
FIG. 14 is a view illustrating a state in which the welding tip is gripped by the fingers.

On the other hand, when the controller 12 determines that it has not received the closed state detection signal from the opening and closing detection part 94 (i.e., determines "NO"), the controller 12 repeats step S26. When it is determined "YES" at this step S26, the fingers 66, 68, and 70 are in the closed state and hold the welding tip 102 from the outside. This state is shown in FIG. 14.

At step S27, the controller 12 detaches the welding tip 102 from the welding torch main body 100. Specifically, the controller 12 sends a command to the rotation drive part 56 so as to rotate the chuck mechanism 60 around the axis $O_1$ in the direction in which the fastening between the welding torch main body 100 and the welding tip 102 can be loosened. As a result, the welding tip 102 is rotated along with being gripped by the fingers 66, 68, and 70, detached from the welding torch main body 100.

At step S28, the controller 12 moves the detached welding tip 102 to the predetermined disposal zone. Specifically, the controller 12 operates the robot 14 in accordance with the robot program so as to move the chuck device 50 to dispose the welding tip 102 above the disposal zone.

At step S29, the controller 12 moves the fingers 66, 68, 70 into the open state, similar to the above-mentioned step S16.

At step S30, the controller 12 determines whether the movement of the fingers 66, 68, 70 has been completed, similar to the above-mentioned step S17. When the controller 12 determines "YES", it ends step S2 shown in FIG. 7, and proceeds to step S3 shown in FIG. 5.

When it is determined "YES" at this step S30, the fingers 66, 68, and 70 are in the open state, and the welding tip 102 gripped by the fingers 66, 68, and 70 is released and received in the disposal zone. On the other hand, when the controller 12 determines "NO" at this step S30, it repeats step S30.

Referring again to FIG. 5, after step S2, at step S3, the controller 12 executes a scheme of attaching a new welding tip to the welding torch main body 100. This step S3 will be described with reference to FIG. 9.

After step S3 is started, at step S31, the controller 12 arranges the fingers 66, 68, and 70 of the chuck device 50 around a new welding tip (not shown). The new welding tip is places at a predetermined location.

The controller 12 operates the robot 14 in accordance with the robot program so as to move the chuck device 50 so that the claws 66c, 68c, 70c of the fingers 66, 68, 70 are arranged at radially outside of the new welding tip.

At step S32, the controller 12 sends a command to the finger drive part 71 so as to synchronously move the fingers 66, 68, and 70 to approach the rotation axis $O_1$ (i.e., the hole 79b), similar to the above-mentioned step S25.

At step S33, the controller 12 determines whether it has received a closed state detection signal from the opening and closing detection part 94, similar to the above-mentioned step S26. When the controller 12 determines that it has received the closed state detection signal from the opening and closing detection part 94 (i.e., determines "YES"), the controller 12 proceeds to step S34.

On the other hand, when the controller 12 determines that it has not received the closed state detection signal from the opening and closing detection part 94 (i.e., determines "NO"), the controller 12 repeats step S33. When it is determined "YES" at this step S33, the fingers 66, 68, and 70 are in the closed state and grip the new welding tip from the outside.

At step S34, the controller 12 positions the gripped welding tip with respect to the welding torch main body 100. Specifically, the controller 12 operates the robot 14 so as to move the chuck device 50 so that a threaded end part formed at the new welding tip is arranged at a screw hole formed at the welding torch main body 100.

At step S35, the controller 12 temporarily mounts the new welding tip to the welding torch main body 100. Specifically, the controller 12 sends a command to the rotation drive part 56 so as to rotate the chuck mechanism 60 around the axis $O_1$ in a direction in which the threaded end part of the new welding tip is screwed into the screw hole of the welding torch main body 100.

At this time, the controller 12 rotates the chuck mechanism 60 by a predetermined number of rotations to such an extent that the new welding tip is not tightly fastened to the welding torch main body 100. The predetermined number of rotations is set by a user, and can be pre-stored in the storage of the controller 12.

At step S36, the controller 12 moves the fingers 66, 68, 70 into the open state, similar to the above-mentioned step S29. As a result, the fingers 66, 68, and 70 are separated away from the new welding tip toward radially outside.

At step S37, the controller 12 determines whether the movement of the fingers 66, 68, 70 has been completed, similar to the above-mentioned step S30. When the controller 12 determines "YES", it proceeds to step S22 in FIG. 9. On the other hand, when the controller 12 determines "NO", it repeats step S37.

When the controller 12 determines "YES" at step S37, the controller 12 carries out step S22 as described above.

Thereby, the new welding tip is received in the hole 79b of the adaptor 79 so as to be unrotatable relative to the hole 79b.

After step S22, at step S38, the controller 12 fastens the new welding tip to the welding torch main body 100. Specifically, the controller 12 sends a command to the rotation drive part 56 so as to rotate the chuck mechanism 60 in the circumferential direction until the threaded end part of the new welding tip is tightly fastened to the screw hole of the welding torch main body 100. Thus, by step S3 shown in FIG. 9, the new welding tip is fastened to the welding torch main body 100.

Referring again to FIG. 5, after step S3, at step S4, the controller 12 executes a scheme of attaching a new nozzle to the welding torch main body 100. Step S4 will be described with reference to FIG. 10.

After step S4 is started, at step S41, the controller 12 arranges the fingers 66, 68, and 70 of the chuck device 50 around a new nozzle (not shown). The new nozzle is placed at a predetermined location.

The controller 12 operates the robot 14 in accordance with the robot program so as to move the chuck device 50 so that the claws 66c, 68c, 70c of the fingers 66, 68, 70 are arranged at radially outside of the new nozzle.

At step S42, the controller 12 sends a command to the finger drive part 71 so as to synchronously move the fingers 66, 68, and 70 to approach the rotation axis $O_1$ (i.e., the hole 79b), similar to the above-mentioned step S32.

At step S43, the controller 12 determines whether it has received a closed state detection signal from the opening and closing detection part 94, similar to the above-mentioned step S33. When the controller 12 determines that is has received the closed state detection signal from the opening and closing detection part 94 (i.e., determines "YES"), it proceeds to step S44.

On the other hand, when the controller 12 determines that it has not received the closed state detection signal from the opening and closing detection part 94 (i.e., determines "NO"), it repeats step S43. When it is determined "YES" at this step S43, the fingers 66, 68, and 70 are in the closed state and grip the new nozzle from the outside.

At step S44, the controller 12 positions the new nozzle with respect to the welding torch main body 100. Specifically, the controller 12 operates the robot 14 in accordance with the robot program so as to move the chuck device 50 so that the axis $O_1$ of the chuck device 50 and the axis $O_2$ of the new welding tip attached to the welding torch main body 100 coincides with each other.

At step S45, the controller 12 attaches the new nozzle to the welding torch main body 100. Specifically, the controller 12 operates the robot 14 so as to move the chuck device 50 axially frontward. Thereby, the new nozzle gripped by the fingers 66, 68, and 70 is pushed onto the welding torch main body 100 so as to be attached thereto.

At step S46, the controller 12 moves the fingers 66, 68, 70 into the open state, similar to the above-mentioned step S29.

At step S47, the controller 12 determines whether the movement of the fingers 66, 68, 70 has been completed, similar to the above-mentioned step S30. When the controller 12 determines "YES", it ends step S4, and thereby ends the flow shown in FIG. 5.

When it is determined "YES" at this step S47, the fingers 66, 68, and 70 are separated away from the new nozzle toward radially outside and thereby releases the new nozzle. On the other hand, when the controller 12 determines "NO", it repeats step S47.

Figure 10:
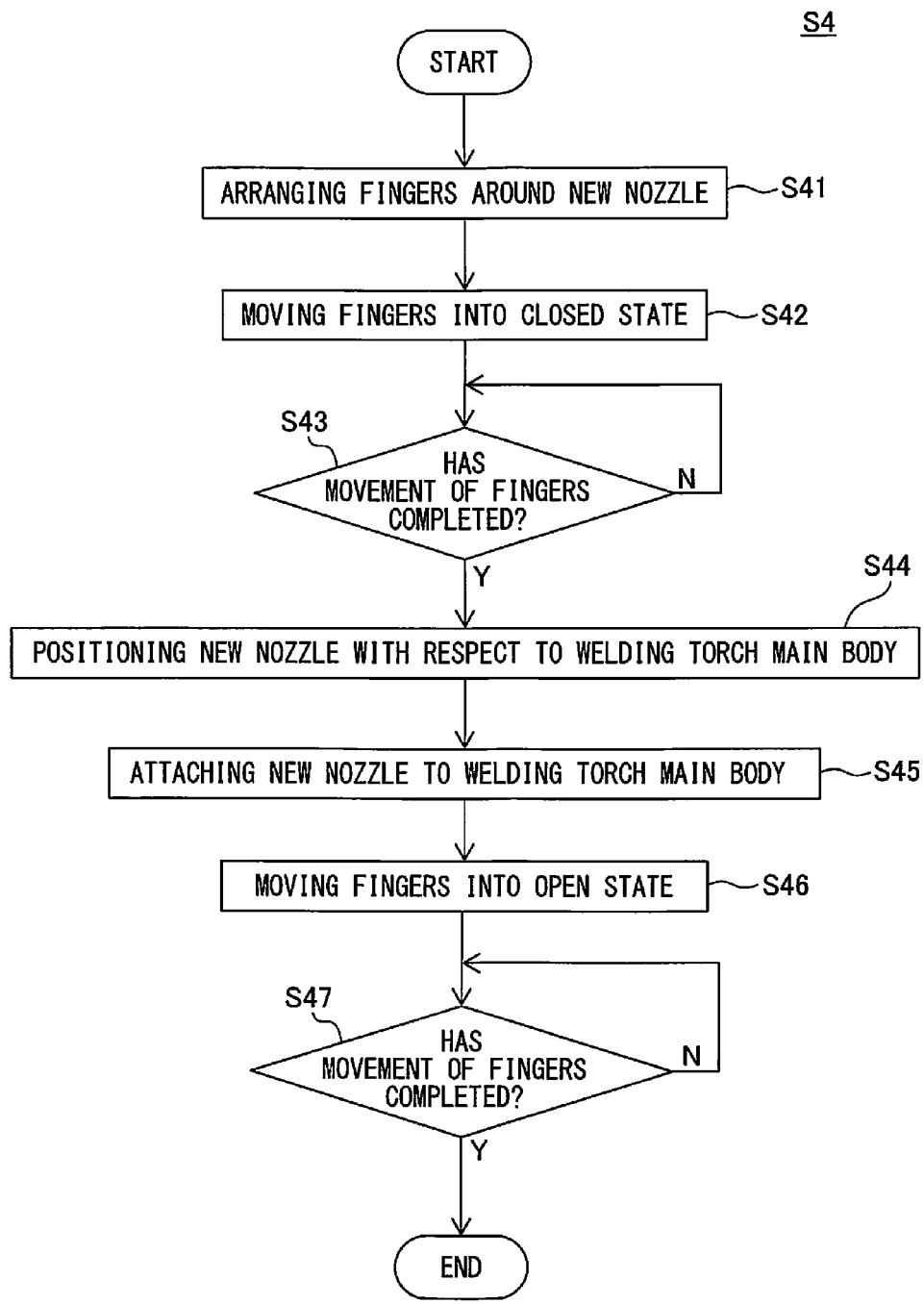
FIG. 10 is a flowchart of step S4 in FIG. 5.

Thus, by step S4 shown in FIG. 10, the new nozzle is attached to the welding torch main body 100 so as to surround the new welding tip.

As described above, in this embodiment, the chuck device 50 includes both the fingers 66, 68, 70 capable of gripping the welding tip 102, and the engagement part (i.e., the hole 79b) capable of engaging the engagement surface of the welding tip 102.

According to this configuration, it is possible to sequentially carry out the operations of detaching the used welding tip 102 from the welding torch main body 100 and transporting the detached welding tip 102 to the predetermined disposal zone, by means of the single chuck device 50 in a continuous manner.

In addition, it is also possible to sequentially carry out the operations of transporting a new welding tip from a predetermined location and attaching the new welding tip to the welding torch main body 100, by means of the single chuck device 50.

Similarly, it is possible to sequentially carry out the operations of detaching the used nozzle 104 from the welding torch main body 100 and transporting the same to a predetermined disposal zone, and also transporting a new nozzle from a predetermined location and attaching the same to the welding torch main body 100, by means of the single chuck device 50.

Therefore, since the change of a multitude of welding tips and nozzles can be carried out in an efficient manner it is possible to shorten a cycle time of a changing process.

Further, according to this embodiment, since the plurality of operations as described above can be carried out by the single chuck device 50, it is not necessary to further provide another device for e.g. transporting a welding tip or nozzle. Accordingly, the device can be simplified, and therefore it is possible to reduce the cost for the chuck device 50.

Further, in this embodiment, the fingers 66, 68, 70 are disposed at the positions which are rotationally symmetrical to each other with respect to the axis $O_1$. In addition, the engagement part (the hole 79b) formed at the adaptor 79 is disposed so as to have the axis $O_1$ as the center thereof.

According to the configuration, when the controller 12 executes step S24 after the welding tip 102 is loosened by the engagement part (the hole 79b) at step S23, the controller 12 can simply moves the chuck base 64 in the axial direction. Accordingly, it is possible to decrease an amount of movement of the chuck base 64, and simplify the robot program for executing such operations.

Further, in this embodiment, the main body 74 is movably supported by the support 72, and the elastic member 90 is inserted between the main body 74 and the support 72. According to this configuration, by executing the operation of step S22, it is possible to reliably engage the welding tip 102 with the engagement part (the hole 79b).

Further, according to this embodiment, the controller 12 can determine whether or not the welding tip 102 and the engagement part are engaged with each other, base on the position detection signal transmitted from the position detection part 92. Due to this, the controller 12 can automatically and promptly carry out the operation of step S22.

Note that, in the above-mentioned embodiment, the chuck device 50 is moved by the robot 14. However, the chuck device 50 may be moved by other transporting devices or manually.

Further, in the above-mentioned embodiment, the controller 12 is configured as a robot controller which controls the robot 14. However, the controller may be configured as e.g. a machine tool controller which controls a machine tool.

Alternatively, the controller may be configured as an element different from the robot controller and the machine tool controller.

Further, in the above-mentioned embodiment, the opening and closing detection part 94 is configured to transmit a closed state detection signal to the controller 12 when the fingers 66, 68, and 70 approach the axis $O_1$ (the hole 79b) within a predetermined distance (e.g., 10 mm).

However, the opening and closing detection part 94 may measure a distance of the fingers 66, 68, and 70 with respect to the axis $O_1$ (the hole 79b), and transmit data of the distance to the controller 12. In this case, the controller 12 may determine "YES" at step S13, 26, 33, or 43, when the distance is smaller than a predetermined threshold value.

Further, the opening and closing detection part 94 may include a first opening and closing detection part used when the nozzle is gripped (step S13, S43) and a second opening and closing detection part used when the welding tip is gripped (step S26, S33).

In this case, the first opening and closing detection part may be configured to transmit a closed state detection signal to the controller 12 when the fingers 66, 68, and 70 approach the axis $O_1$ (the hole 79b) within a predetermined first distance (e.g., 12 mm).

On the other hand, the second opening and closing detection part may be configured to transmit a closed state detection signal to the controller 12 when the fingers 66, 68, and 70 approach the axis $O_1$ (the hole 79b) within a predetermined second distance (e.g., 8 mm).

Further, in the above-mentioned embodiment, the adaptor 79 is a member separate from the base block 78. However, the adaptor 79 may be provided integrally with the base block 78. Alternatively, the hole 79b may be directly formed at the base block 78 so as to be recessed inward from an axially front end surface of the base block 78.

Further, as the engagement part which engages the engagement surface of the welding tip 102, not only the hole 79b but a plurality of protrusions may be employed. For example, the adaptor 79 may include a plurality of protrusions which project axially frontward from the end surface 79a and which are arranged in the circumferential direction.

Each of the protrusions engages the engagement surface of the welding tip 102 so that the welding tip 102 cannot rotate in the circumferential direction with respect to the chuck base 64. In this case, the protrusions may be disposed at positions which are rotationally symmetrical to each other with respect to the axis $O_1$.

Further, in the above-mentioned embodiment, the elastic member 90 is inserted between the support 72 and the main body 74 and urges the main body 74 axially frontward. However, instead of the elastic member 90, a magnet may be employed to urge the main body 74 axially frontward by the action of magnetic force, for example.

Further, in the above-mentioned embodiment, a total of three fingers 66, 68, and 70 are provided. However, two, four or more fingers may be provided.

The invention has been described above according to embodiments of the invention, but the embodiments as described above do not restrict the invention according to the claims. Moreover, embodiments in which the features described in the embodiments of the invention are combined can be also included in the technical scope of the invention, but all the combinations of these features are not necessarily essential to means provided by aspects of the invention. Further, it is apparent to those skilled in the art that the embodiments as described above can be modified or improved in various ways.

In addition, it should be noted that procedures of processing of operations, orders, steps, processes and the like of devices, systems, programs, and methods disclosed in the claims, the specification, and the drawings may be performed in an arbitrary order as long as description is not particularly made using "before", "prior to", or the like and an output of previous processing is not used in subsequent processing. Even though the operation flows in the claims, the specification, and the drawings are described using "first," "next," "subsequently", "then" or the like for the sake of convenience, it is not meant that the operation flows are necessarily performed in this order.

The invention claimed is:

1. A chuck device configured for changing a welding tip and a nozzle surrounding the welding tip, the welding tip being screwed into a welding torch main body, the chuck device comprising:
   a chuck base rotatably provided for rotation about a rotation axis;
   an engagement part fixed to the chuck base so as to rotate integrally with the chuck base about the rotation axis, and configured to engage an engagement surface formed at an outer circumferential surface of the welding tip, the engagement part rotating the welding tip together with the chuck base when the engagement part engages the engagement surface and the chuck base is rotated about the rotation axis; and
   a plurality of fingers provided at the chuck base and configured to open and close, the plurality of fingers being configured to move in directions approaching and separating away from the engagement part and grip each of the welding tip and the nozzle, the plurality of fingers moving in the direction approaching the engagement part so as to be brought into a closed state and moving in the direction separating away from the engagement part so as to be brought into an open state,
   wherein the chuck base includes:
     a main body at which the plurality of fingers and the engagement part are provided;
     a support which supports the main body so as to be movable along the rotation axis of the chuck base; and
     an elastic member interposed between the main body and the support, and configured to expand and contract in a direction of the rotation axis, and
   wherein the chuck device further comprises a position detection part configured to detect that the main body is arranged at a stroke end position separated away from the support in the direction of the rotation axis by a predetermined distance.

2. A robot, comprising:
   a chuck device configured for changing a welding tip and a nozzle surrounding the welding tip, the welding tip being screwed into a welding torch main body, the chuck device comprising:
     a chuck base rotatably provided for rotation about a rotation axis;
     an engagement part fixed to the chuck base so as to rotate integrally with the chuck base about the rotation axis, and configured to engage an engagement surface formed at an outer circumferential surface of the welding tip, the engagement part rotating the welding tip together with the chuck base when the engagement part engages the engagement surface and the chuck base is rotated about the rotation axis; and a plurality of fingers provided at the chuck base and configured to open and close, the plurality of fingers being configured to move in directions approaching and separating away from the engagement part and grip each of the welding tip and the nozzle, the plurality of fingers moving in the direction approaching the engagement part so as to be brought into a closed state and moving in the direction separating away from the engagement part so as to be brought into an open state; and
a robot arm to which the chuck base is attached,
wherein the chuck base includes:
a main body at which the plurality of fingers and the engagement part are provided;
a support which supports the main body so as to be movable along the rotation axis of the chuck base; and
an elastic member interposed between the main body and the support, and configured to expand and contract in a direction of the rotation axis, and
wherein the chuck device further comprises a position detection part configured to detect that the main body is arranged at a stroke end position separated away from the support in the direction of the rotation axis by a predetermined distance.

3. A chuck device, arranged in proximity to a welding torch main body, the chuck device configured for changing a welding tip and a nozzle surrounding the welding tip, the welding tip being screwed into the welding torch main body, the chuck device comprising:
a chuck base rotatably provided for rotation about a rotation axis;
an engagement part fixed to the chuck base so as to rotate integrally with the chuck base about the rotation axis, the engagement part comprising a non-circular hole configured to engage an engagement surface formed at an outer circumferential surface of the welding tip, the engagement part rotating the welding tip together with the chuck base when the engagement part engages the engagement surface and the chuck base is rotated about the rotation axis; and
a plurality of fingers provided at the chuck base and configured to open and close, the plurality of fingers configured to move in directions approaching and separating away from the engagement part and grip each of the welding tip and the nozzle, the plurality of fingers moving in the direction approaching the engagement part so as to be brought into a closed state and moving in the direction separating away from the engagement part so as to be brought into an open state.

4. The chuck device according to claim 3, wherein the plurality of fingers are arranged at positions which are rotationally symmetrical to each other with respect to the rotation axis of the chuck base.

5. The chuck device according to claim 3, wherein the engagement part includes a wall surface defining the hole, which hole receives the welding tip.

6. The chuck device according to claim 3, wherein the chuck base includes:
a main body at which the plurality of fingers and the engagement part are provided;
a support which supports the main body so as to be movable along the rotation axis of the chuck base; and
an elastic member interposed between the main body and the support, and configured to expand and contract in a direction of the rotation axis.

7. The chuck device according to claim 6, further comprising a position detection part configured to detect that the main body is arranged at a stroke end position separated away from the support in the direction of the rotation axis by a predetermined distance.

8. The chuck device according to claim 3, further comprising:
an opening and closing detection part configured to detect opening and closing of the plurality of fingers.

9. The chuck device according to claim 3, further comprising:
a rotation drive part configured to rotate the chuck base; and
a finger drive part configured to move the plurality of fingers.

10. A robot, comprising:
a chuck device, arranged in proximity to a welding torch main body, the chuck device configured for changing a welding tip and a nozzle surrounding the welding tip, the welding tip being screwed into the welding torch main body, the chuck device comprising:
a chuck base rotatably provided for rotation about a rotation axis;
an engagement part fixed to the chuck base so as to rotate integrally with the chuck base about the rotation axis, the engagement part comprising a non-circular hole configured to engage an engagement surface formed at an outer circumferential surface of the welding tip, the engagement part rotating the welding tip together with the chuck base when the engagement part engages the engagement surface and the chuck base is rotated about the rotation axis; and
a plurality of fingers provided at the chuck base and configured to open and close, the plurality of fingers configured to move in directions approaching and separating away from the engagement part and grip each of the welding tip and the nozzle, the plurality of fingers moving in the direction approaching the engagement part so as to be brought into a closed state and moving in the direction separating away from the engagement part so as to be brought into an open state; and
a robot arm to which the chuck base is attached.

* * * * *